United States Patent
Schlums

[11] 3,731,500
[45] May 8, 1973

[54] UNIVERSAL JOINT COUPLING

[75] Inventor: Karl-Dieter Schlums, 3301 Volkmarode, Germany

[73] Assignee: Braunschweigische Maschinenbauanstalt, Am alten Bahnhof, Germany

[22] Filed: June 1, 1971

[21] Appl. No.: 148,649

[30] Foreign Application Priority Data

June 4, 1970  Germany................P 20 27 349.8

[52] U.S. Cl.....................................................64/14
[51] Int. Cl..................................................F16d 3/64
[58] Field of Search..........................64/21, 23, 9, 14

[56] References Cited

UNITED STATES PATENTS

| 3,321,935 | 5/1967 | Wildhaber | 64/14 X |
| 2,219,142 | 10/1940 | Williams | 64/14 |
| 3,645,114 | 2/1972 | Shepherd | 64/14 |

*Primary Examiner*—Edward G. Favors
*Attorney*—W. G. Fasse

[57] ABSTRACT

The present universal joint coupling permits a tilting movement of two shafts relative to each other and relative to an intermediate connecting piece or vice versa through first and second coupling means preferably arranged mirror symmetrically relative to each other, wherein each coupling means includes cooperating gear teeth with flanks which are sufficiently spaced from each other in the torque transmitting direction for locating a so called vibration mount between adjacent flanks of each torque transmitting flank pair whereby all vibration mounts are rigidly connected to their respective flanks for preventing a relative longitudinal displacement between the flanks and the vibration mounts.

11 Claims, 4 Drawing Figures

Patented May 8, 1973
3,731,500
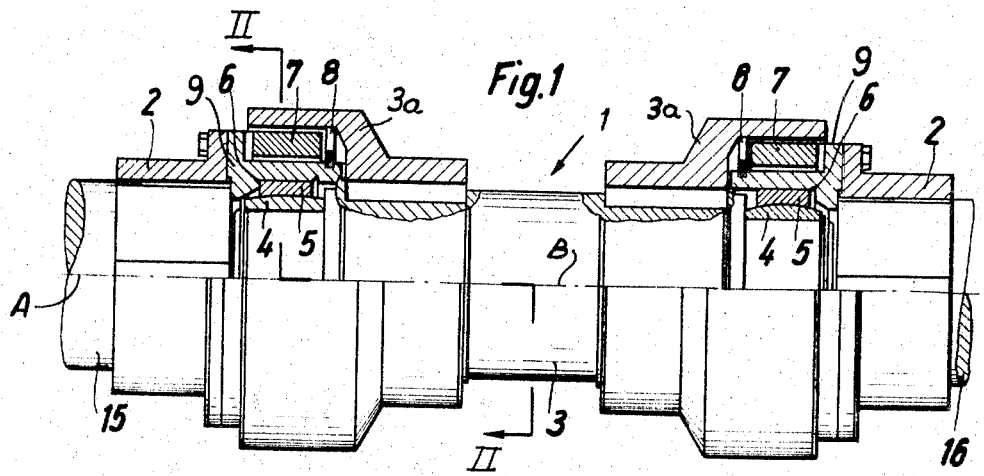
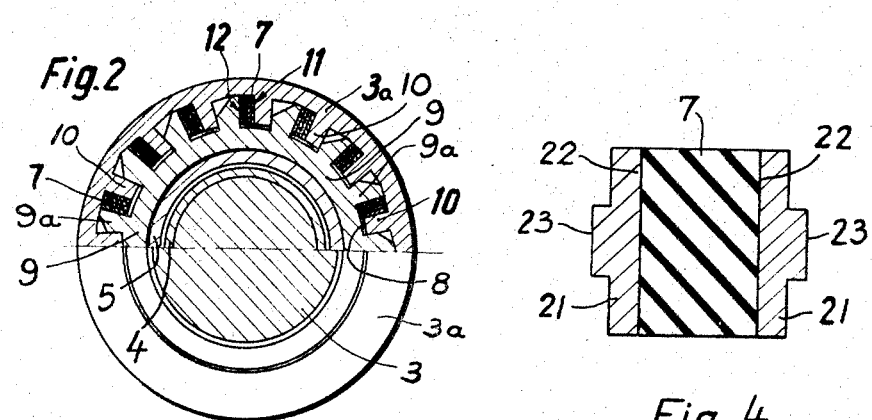
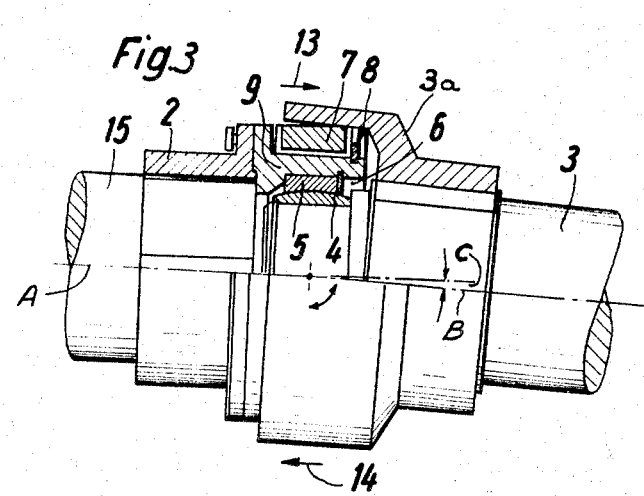
Inventor:
KARL-DIETER SCHLUMS
BY *Co. G. Fasse*
ATTORNEY

UNIVERSAL JOINT COUPLING

BACKGROUND OF THE INVENTION

The present invention relates to a universal joint coupling, more specifically, a double gear coupling operating in the manner of a cardanic or universal joint in which the ends of an intermediate connecting piece are connected to the ends of the shafts by means of bulging guide surfaces to permit a pivoting movement while simultaneously preventing an axial movement. The torque transmitting elements which intermesh with each other in the manner of gear teeth are arranged substantially concentrically relative to said guide surfaces.

The intermediate connecting piece in universal joint couplings of the just described type is tilted more or less relative to the axes of rotation of the two shafts depending upon the size of the vertical and lateral displacement of the driving and driven shaft relative to each other. When the two shafts rotate axially extending relative motions tend to occur between the elements of the coupling means, especially the bushings, and the intermediate connecting piece in the area in which the rotational axes of the driving and driven shaft intersect with the intermediate connecting piece.

Prior art couplings generally are so arranged that the structural members which snugly intermesh with each other and which are displaceable in the axial direction of the intermediate connecting piece are provided with suitable gliding surfaces which are oriented in the axial direction in order to allow for said axial relative movement. In these prior art couplings, tangential forces are also transmitted as normal forces through these gliding surfaces because the torque moment is transmitted between the driving and the driven shaft through these gliding surfaces to the intermediate connecting piece and vice versa in the form of a tangential force.

The mentioned relative movements are the larger, the larger the axial displacement between the driving and driven shaft. Moreover, the normal load under which the gliding surfaces rest upon each other increases as the torque moment to be transmitted increases. Surfaces which glide upon each other are subject to wear and tear, especially when the gliding takes place under loaded conditions. Additionally, these surfaces require a continuous servicing or at least a continuous lubrication. Moreover, the wear and tear causes an erosion in limited zones of the gliding surfaces resting upon each other whereby the gliding surfaces become rough and an unimpeded axial displacement becomes impossible since such roughness may produce uncontrollably large axial forces which subject the adjacent structural members to considerable extraordinary load conditions.

Yet another disadvantage of surfaces gliding upon each other is seen in that constructing or producing such surfaces is rather involved from a technical point of view and thus such structures are rather expensive.

More recent prior art developments have realized the drawbacks of gliding movements in such couplings. Thus, German Patent Publication 1,059,252 discloses a universal joint coupling comprising double gear means in which the ends of the shafts to be coupled are interconnected with the ends of a rigid sleeve like intermediate piece by means of bulging guide surfaces which permit a pivoting but which prevent an axial displacement. The shaft ends and intermediate piece are further interconnected by gear like intermeshing torque transmitting elements which concentrically surround the guide surfaces. The bulging guide surfaces fix the position of the intermediate piece ends and the shaft ends relative to each other. However, the torque transmission takes place exclusively through said torque transmitting elements. In this known double gear coupling, it is necessary to machine the gear like intermeshing torque transmitting elements with high precision in order to assure an all around even load bearing intermeshing. In addition, these torque transmitting elements glide upon each other under high loads when the coupling is in operation and are thus subject to a high wear and tear. When the axial parallel position of the coupling elements relative to each other is changed while the coupling is subject to the torque load, a relatively high frictional force occurs in the coupling in the form of an axial force against which the change or variation of the axial parallelism must take place. Another drawback is seen in the fact that the wear and tear taking place under load conditions causes the formation of lugs and shoulders on the interengaged surfaces of the torque transmitting elements which lugs and shoulders interfere with the further gliding movement whereby in addition to the frictional forces large additional axial forces may occur as if the gliding surfaces where actually form locked to each other. As a result, the known device requires a continuous lubrication and accordingly a continuous maintenance.

U. S. Pat. No. 2,645,105 discloses a double gear coupling in which there is arranged between the effective torque transmitting elements a bearing block. The bearing block is connected to one of the two cooperating torque transmitting elements by means of a loose pin and slot connection which permits a relative motion. The surfaces which contact each other are cylindrically bend relative to a plane extending through the axis of the coupling in order to make possible a displacing or adjusting of the bearing block relative to the corresponding torque transmitting surface. As a result, in this prior art device relative gliding movements occur between the torque moment or load transmitting surfaces in spite of the use of a bearing block. In addition the number of the gliding surfaces per pair of torque transmitting members or elements is twice as large in the just described prior art embodiment as compared to the prior art embodiment described above. Accordingly, the mentioned drawbacks such as substantial wear and tear and continuous maintenance requirements occur to an even large extent.

Belgian Pat. No. 622,005 illustrates an elastic coupling from which it is known to place a ring shaped rubber element between the torque transmitting surfaces of the coupling and to connect the rubber element with these surfaces. In this known coupling, the two coupling elements or members are initially in gliding contact with each other through spherical surfaces in order to accommodate deviations from an exact coaxial position. The torque transmitting surfaces are also arcuate surfaces arranged concentrically relative to each other and with a radial spacing therebetween wherein said rubber ring is located whereby the torque moment is transmitted through the rubber ring while subjecting it to a shearing stress. Thus, the coupling according to this Belgian Patent does not involve a gear coupling. Besides, this known coupling is suitable only for low torque moments because the torque moment load to which the rubber ring is subjected quickly reaches a given limit.

The use of rubber elements in connection with a double gear coupling is known as such from British Patent No. 731,081. However, in this known coupling, the cooperating, torque transmitting gear teeth directly contact each other. The difference between the arrangement according to this British Patent and other prior art double gear couplings resides merely in that the gear teeth of one set of torque transmitting elements are individually supported in the corresponding coupling element for rotation about an axis extending along a radius of the coupling element whereby such supporting may be in an elastic manner by using a rubber sleeve or bushing.

OBJECTS OF THE INVENTION

In view of the foregoing, it is the aim of the invention to achieve the following objects, singly or in combination:

to overcome the outlined drawbacks of the prior art;
to simplify the production of double gear couplings of the universal joint type;
to provide a universal joint coupling of the double gear type which has a high durability while simultaneously it does not require a constant lubrication and maintenance;
to provide a universal joint coupling in which the torque is transmitted through resiliently yielding means by subjecting these means to pressure only and not to any shearing forces, at least as long as the axes of the two shafts to be coupled retain their axial position relative to each other;
to arrange the elements of the coupling and especially the resilient means in such a manner that an axial displacement is avoided and only an axial yielding is necessary for the changing of the shaft axes relative to each other;
to avoid a precision machining of the cooperating gear teeth flanks;
to assure an elastic torque transmission;
to accommodate or compensate for small differences in the angular velocities of the two shafts to be coupled to each other; and
to provide a double gear coupling in which the teeth are rigidly connected to the respective coupling elements wherein at least between cooperating gear teeth flanks an element is arranged which is capable of yielding at least in the direction of the axis of the coupling.

SUMMARY OF THE INVENTION

According to the invention there is provided a universal joint double gear coupling in which the ends of an intermediate connecting piece are connected through bulging guide surfaces with the ends of the shafts to be coupled, such connection permitting a pivoting but preventing an axial displacement and further comprising torque transmitting elements which intermesh with each other in the manner of gear teeth, whereby the elements are arranged substantially concentrically relative to said guide surfaces. The gear teeth or torque transmitting elements are spaced from each other in the torque transmitting direction so as to provide a spacing between flanks which face each other. Resilient means, such as vibration mounts which are known per se are located in said spacings and rigidly connected to the gear teeth flanks, said resilient means yielding at least in the direction of the axis of the coupling.

The arrangement of the resilient e ns in the manner taught by this invention has the advantage that the resilient means are subjected to pressure exerting forces when torque is transmitted. Thus, shearing is avoided except where the axial position of the coupling elements relative to each other is changed.

BRIEF FIGURE DESCRIPTION:

In order that the invention may be clearly understood, it will now be described, by way of example, with reference to the accompanying drawings, wherein:

FIG. 1 illustrates a side view, partially in section, of a double gear coupling according to the invention whereby the axes of each coupling means are aligned with each other in a longitudinal direction;

FIG. 2 is a sectional view along the section line II—II as shown in FIG. 1; and

FIG. 3 is a view similar to that of FIG. 1, except that only one of the coupling means of the double gear coupling is shown in a position in which the axes of the coupling proper and of an intermediate connecting piece are arranged at an angle relative to each other; and FIG. 4 is a sectional view of a so-called vibration mount modified for use in accordance with the present invention.

DESCRIPTION OF EXAMPLE EMBODIMENTS

The universal joint coupling 1, according to the invention, comprises two coupling means which are essentially mirror symmetrical to each other so that the description of one coupling means applies equally to the other coupling means and the same reference numerals are employed to designate the same elements in both coupling means.

The universal joint coupling, according to the invention, comprises two sleeves 2 and an intermediate connecting piece 3. The sleeves 2 are rigidly secured to the ends 15 and 16 of the driving shaft and the driven shaft respectively. The intermediate connecting piece 3 interconnects the two sleeves with each other in a pivoting as well as in a driving manner. The end of the driving shaft 15 has a longitudinal axis A and the intermediate connecting piece 3 has a longitudinal axis B.

The intermediate connecting piece 3 carries at each of its ends a bulging guide ring 4 each of which cooperates with a correspondingly shaped glide guide ring 5 held in position inside said sleeve 2, for example between a shoulder 6 and a snap ring. The cooperation between the guide rings 4 and 5 pivotally interconnects the respective shaft end with the end of the intermediate connecting piece 3 so that the axes A and B of the shafts 15 and 16 may be displaced relative to each other. State differently, the axes A and B may be tilted relative to each other to include an angle C as shown in FIG. 3. However, a driving force cannot be transmitted through the bulging guide rings 4 and the glide guide ring 5 between the respective sleeve 2 and the intermediate piece 3.

For transmitting a rotational driving force between the shaft ends and the intermediate connecting piece 3 there is rigidly attached to each end of the intermediate connecting piece 3 a somewhat bell shaped bushing 3a which is secured against rotation, for example by a key and key way, and against axial displacement relative to the intermediate connecting piece 3, for example by snap rings well known in the art. Each bell shaped bushing 3a is provided with radially inwardly extending torque transmitting teeth 10 having teeth flanks 11.

These teeth 10 cooperate with similar teeth 9a extending radially outwardly from a torque transmitting member 9 rigidly secured to its respective shaft end 15 or 16, preferably through said sleeve 2, whereby these torque transmitting members 9 are secured against rotational as well as against axial displacement. The teeth 9a which extend radially outwardly from the torque transmitting member 9 also has flanks 12 arranged to face said flanks 11. The opposite side of the teeth 9a is provided with a chamfer.

In the assembled condition of the present coupling, the teeth 9a extend into the spaces between the teeth 10. The flanks 11 and 12 of the teeth are spaced from each other in the torque transmitting direction so as to provide pockets 8 between these flanks. According to the invention, resilient means 7, such as vibration mounts, are located in these pockets 8. The vibration mounts, one of which is shown in FIG. 4, as such are known and comprise a piece of rubber 20, for example, between the metal plates 21. The interface 22 between the rubber 20 and the metal plates 21 may be vulcanized to the metal plates to form an integral unit. The metal plates of the vibration mounts are rigidly secured to the respective flanks 11 and 12 to prevent longitudinal axial movement, for example, by tongues 23 as seen in FIG. 4. The tongues 23, due to the yielding of the rubber 20, may be snapped into respective grooves, not shown, in the flanks 11 and 12. The connection between the flanks 11 and 12 and the metal plates 21 may also be accomplished by any other suitable means, for example, by a weldment, screws or by gluing.

Referring further to FIG. 2, it is assumed that in the illustrated embodiment the torque transmission is only in one direction, namely, in the clockwise direction. Thus, it will be seen that a torque transmission in the clockwise direction will exclusively exert pressure on the vibration mount elements 7. This has the advantage, that large torque moments may be transmitted without over-straining the rubber of the vibration mount elements. Another advantage is seen in that by a suitable selection of the type of rubber and the rubber characteristics it is possible to elastically transmit the torque moment in the rotational direction through the vibration mount.

The bushing 3a with its teeth 10 forms an integral unit. In the illustrated embodiment, the sleeve 2 and the torque transmitting member 9 are separate elements whereby the sleeve 2 and the member 9 may be connected to each other, for example, by means of flanges through which screws extend as seen in FIGS. 1 and 3. However, it is also possible to form the sleeve 2 and the member 9 together with the teeth 9a as an integral one piece unit.

The vibration mounts 7 are elastically deformable in the torque transmitting direction under the influence of the torque transmitting circumferential forces. In addition these resilient means are also elastically deformable in the axial direction, however, they are not displaceable in the axial direction. By a suitable selection of the material for the vibration mounts 7, these may simultaneously operate as vibration dampening means.

As seen in FIG. 3, and as mentioned above, the axes A and B of the shaft end 15 and of the intermediate connecting piece 3 may take up within predetermined limits an angular position relative to each other as indicated by the angle C without impeding or hindering the transmission of the torque moment, that is, the surfaces which cooperate in transmitting the torque moment will not glide along each other even when the axes A and B change their position relative to each other, because the resilient means 7 are capable of a slight axial yielding. The avoidance of wear and tear causing gliding movements constitutes a substantial advance in the art. Thus, wear and tear is substantially reduced according to the invention because the relative movement between the torque transmitting flanks 11 and 12 resulting from a change of the angular position of the axes A and B relative to each other is taken up without any gliding movement by the inner deformation of the rubber of the vibration mount elements 7. On the other hand, the gliding movement between the bulging surface of the ring 4 and the cooperating surface of the ring 5 takes place without being subject to any load so that any frictional forces between the cooperating surfaces of the rings 4 and 5 are small enough to be disregarded. Incidentally, the relative displacement of the shaft 15 and the intermediate connecting piece 3 is indicated by the arrows 13 and 14 in FIG. 3.

From FIG. 2 it may be seen that the back flanks of the teeth 9a and the teeth 10 might glide along each other upon a tilting or pivoting movement of the axes A and B. However, since the transmittal of the torque is in the clockwise direction, these back flanks are not subject to any load when such gliding may take place. In fact, the back flanks may be out of contact with each other during the torque transmittal in the clockwise direction. Accordingly, frictional forces if any, between the back flanks are minimized. The chamfers on the back flanks of the teeth 9a are also helpful in this respect since they reduce the size of the back flank surface of the teeth 9a.

From the foregoing it will be appreciated that the vibration mount elements 7 do not require any maintenance and are virtually not subject to any wear and tear worth mentioning. Another advantage of the invention is seen in that the production of the present couplings does not require the maintaining of close tolerances when shaping or forming the torque transmitting members 9 and 10.

Just as the sleeve 2 and the member 9 could be formed as an integral structure, it is also possible to form the intermediate connecting piece 3 and the bushing 3a as an integral structure. However, in the alternative and to facilitate the assembly it may be desirable to construct the sleeve 2 as well as the intermediate connecting piece 3 by employing separable elements.

Locating the resilient means 7 as taught by this invention does not impede the displacement of the axes A and B out of an aligned position. Thus, it is an advantage of the invention that, as mentioned, the relative movement of these axes does not cause any frictional forces or relative gliding motions between the torque transmitting elements because the elastic deformation of the resilient means 7 take up the movement of the shaft ends 15 and 16 as well as of the intermediate connecting piece 3.

It has been found that a change or variation in the relative axial position of the coupling elements causes very small inner deformation forces in the resilient elements and even under loads these inner deformation forces remain substantially constant. Accordingly, the resilient elements have a long, useful life even where large torque moment loads are transmitted.

A further resulting advantage is the fact, that even prolonged use of the present coupling does not result in any appreciable wear and tear of the torque transmitting surfaces 11 and 12 so that a continuous lubrication and maintenance has been obviated by the invention.

Another very important advantage of the invention is seen in that said torque transmitting surfaces 11 and 12 do not require any precise machining because irregularities in these surfaces or deviations from given dimensions are taken up or equalized by the resilient means 7 positioned in the pockets 8 between these surfaces 11 and 12.

Especially where the resilient means are provided in the form of so called vibration mounts (Schwingmetalelemente) an elastic torque transmittal may be effected. Furthermore, the resilient means compensate small differences between the angular velocities of the driving shaft and the driven shaft. Such differences may occur when the two shafts are in an angular position relative to each other or when they are slanted in space. This compensating effect of the coupling according to the invention has the important advantage that torque moment variations or fluctuations remain small where normal angular displacement results due to mounting inaccuracies.

Yet another advantage is seen in the fact that the resilient means act as a vibration dampening means so that peak loads and rough torsional impacts are minimized as to their effect.

With regard to the above mentioned angular velocity differences compensating effect achieved by the present coupling, it is to be noted that it eliminates substantial, disadvantageous dynamic load conditions for the driving and the driven apparatus thus prolonging the life of the driving and driven machines. Moreover, the use of the present couplings substantially facilitates the mounting of the driving and driven machines and the alignment of these machines relative to each other because the high degree of care and precision heretofore required is not necessary any more since the present coupling prevents that alignment errors may become effective.

Although specific embodiments of the present invention have been described, it is to be understood, that it is intended to cover all modifications and equivalents within the scope of the appended claims.

What I claim is:

1. A universal joint coupling for pivotally connecting two shaft ends to each other, each of said shaft ends having a longitudinal axis, comprising first and second pivoting means, said first and second pivoting means comprising mating convex and concave surfaces respectively, means for fixedly securing said convex and concave surfaces to separate said shafts, whereby the first and second pivoting means cooperate with each other in permitting the pivoting of the shaft ends relative to each other, first and second gear means having cooperating flanks, means for affixing each of said gear means to a respective one of said shaft ends whereby the first and second gear means cooperate with each other for transmitting torque from one shaft end to the other shaft end, and resilient means located between adjacent cooperating flanks, said resilient means yielding at least in directions defined by said longitudinal axes.

2. The universal joint coupling according to claim 1, wherein said resilient means comprise a plurality of vibration mounts.

3. The universal joint coupling according to claim 1, wherein said resilient means comprise vibration dampening means.

4. The universal joint coupling according to claim 2, wherein each of said vibration mounts comprises a rubber cushion and lateral metal plates said rubber cushion being connected to said metal plates, and means for rigidly connecting said metal plates to said flanks, whereby a displacement of the resilient means relative to said flanks in the direction of said longitudinal axes is prevented.

5. The universal joint coupling according to claim 1, wherein said first gear means comprise a first bushing and first gear teeth forming an integral part of said first bushing inside of the first bushing and means for securing said first bushing to one of said shaft ends, said second gear means comprising a further bushing and further gear teeth forming an integral part of said further bushing on the outside of the further bushing, said first and further gear teeth comprising said cooperating flanks sufficiently spaced from each other in a torque transmitting direction for locating said resilient means between adjacent cooperating flanks.

6. The universal joint coupling according to claim 1, wherein adjacent coupling flanks of said gear means extend substantially in parallel to each other.

7. A universal joint coupling for pivotally connecting two shafts to each other, each of said shafts having a longitudinal axis and a coupling shaft end, comprising an intermediate connecting piece having first and second ends, first coupling means arranged between one of said shaft ends and the first end of said intermediate connecting piece, second coupling means arranged between the other of said shaft ends and the second end of said intermediate connecting piece, each of said first and second coupling means comprising pivoting means, means for securing said pivoting means to a respective one of said shaft ends and to a respective end of said intermediate connecting piece whereby the pivoting means cooperate with each other in permitting the pivoting of the shafts and of the intermediate connecting piece relative to each other, gear means having cooperating flaNks, means for connecting said gear means to a respective one of said shaft ends and to a respective end of said intermediate connecting piece, whereby the gear means cooperate with each other for transmitting torque from one of said shafts through the intermediate connecting piece to the other shaft, and resilient means located between adjacent cooperating flanks, said resilient means yielding at least in a direction defined by said longitudinal axes.

8. The universal joint coupling according to claim 7, wherein said resilient means comprise a plurality of vibration mounts rigidly connected to the respective flanks.

9. The universal joint coupling according to claim 7, wherein said resilient means comprise vibration dampening means.

10. The universal joint coupling according to claim 7, wherein said gear means comprise gear teeth sufficiently spaced from each other in a torque transmitting direction for locating said resilient means between adjacent cooperating flanks.

11. The universal joint coupling according to claim 7, wherein said pivoting means comprise cooperating concave and convex surfaces.

* * * * *